(12) United States Patent
Fujita et al.

(10) Patent No.: US 12,643,746 B2
(45) Date of Patent: Jun. 2, 2026

(54) TRANSPORT DEVICE

(71) Applicant: ZUIKO CORPORATION, Osaka (JP)

(72) Inventors: Yukihiko Fujita, Osaka (JP); Takashi Arima, Osaka (JP); Takayoshi Kawano, Osaka (JP); Hideyuki Nakamura, Osaka (JP)

(73) Assignee: ZUIKO CORPORATION, Osaka (JP)

( * ) Notice: Subject to any disclaimer, the term of this patent is extended or adjusted under 35 U.S.C. 154(b) by 194 days.

(21) Appl. No.: 18/573,619

(22) PCT Filed: Jul. 14, 2022

(86) PCT No.: PCT/JP2022/027720
§ 371 (c)(1),
(2) Date: Dec. 22, 2023

(87) PCT Pub. No.: WO2023/008211
PCT Pub. Date: Feb. 2, 2023

(65) Prior Publication Data
US 2024/0327135 A1     Oct. 3, 2024

(30) Foreign Application Priority Data

Jul. 30, 2021     (JP) ................................. 2021-125052
Nov. 12, 2021     (JP) ................................. 2021-184703

(51) Int. Cl.
B65G 47/84          (2006.01)
(52) U.S. Cl.
CPC ...... B65G 47/848 (2013.01); B65G 2201/022 (2013.01)
(58) Field of Classification Search
CPC ............ B65G 47/848; B65G 2201/022; B65H 29/241; A61F 13/15764
See application file for complete search history.

(56) References Cited

U.S. PATENT DOCUMENTS 6,722,494 B2 *  4/2004  Nakakado ............ B65G 47/848
                                                    198/470.1
6,748,996 B2 *  6/2004  Nakakado ......... A61F 13/15764
                                                    414/754
(Continued)

FOREIGN PATENT DOCUMENTS

EP          3254994 A1 * 12/2017  ........... B65G 47/847
EP          3984924 A1    4/2022
(Continued)

OTHER PUBLICATIONS

IPSearch History Feb. 20, 2026 UTC; InnovationQ+; https://iq.ip.com/discover (Year: 2026).*
(Continued)

*Primary Examiner* — Gene O Crawford
*Assistant Examiner* — Abby A Jorgensen
(74) *Attorney, Agent, or Firm* — Renner, Otto, Boisselle & Sklar, LLP

(57)          ABSTRACT

A transport device includes a plurality of pads that hold and transport a workpiece while a peripheral speed is changed. The transport device further includes: a rotation shaft having an axial line serving as a rotation center; a rotation body that rotates around the rotation shaft; the plurality of pads that hold and transport the workpiece while the peripheral speed is changed with respect to the rotation shaft; transmission mechanisms that change a speed of each pad; and a motor provided for each pad and including an output shaft that drives each of the transmission mechanisms. In the transport device, each motor is attached to the rotation body, and is arranged around the axial line of the rotation shaft such that the output shafts are parallel to each other in a direction in which the axial line of the rotation shaft extends.

7 Claims, 8 Drawing Sheets

(56)                    References Cited

U.S. PATENT DOCUMENTS

| | | | | |
|---|---|---|---|---|
| 7,650,984 B2 * | 1/2010 | Giuliani | ............... | B65G 47/848 |
| | | | | 198/459.8 |
| 9,259,359 B2 * | 2/2016 | Fujita | ................ | A61F 13/15747 |
| 10,117,788 B2 * | 11/2018 | Maehara | ................. | B32B 38/18 |
| 10,266,362 B2 * | 4/2019 | McCabe | ................ | B65H 39/14 |
| 11,345,556 B2 * | 5/2022 | Sato | ....................... | B65H 27/00 |
| 2002/0125105 A1 | 9/2002 | Nakakado | | |
| 2008/0196564 A1 * | 8/2008 | McCabe | ............... | B65H 35/08 |
| | | | | 83/152 |
| 2010/0012458 A1 | 1/2010 | Giuliani et al. | | |
| 2015/0166294 A1 | 6/2015 | Perego et al. | | |
| 2021/0104944 A1 * | 4/2021 | Yamamoto | ........... | H02K 41/031 |

FOREIGN PATENT DOCUMENTS

| | | | | | |
|---|---|---|---|---|---|
| JP | H04-371416 | A | 12/1992 | | |
| JP | 2005-298193 | A | 10/2005 | | |
| JP | 4054191 | B2 | 2/2008 | | |
| JP | 5347148 | B2 | 11/2013 | | |
| JP | 2015-530931 | A | 10/2015 | | |
| JP | 2016-50095 | A | 4/2016 | | |
| WO | WO-2008087479 | A1 * | 7/2008 | ............. | B65G 47/32 |
| WO | WO-2015079367 | A1 * | 6/2015 | ........... | B65H 29/241 |
| WO | WO-2018011905 | A1 * | 1/2018 | ....... | A61F 13/15764 |
| WO | WO-2018085830 | A2 * | 5/2018 | ........... | B65G 47/252 |
| WO | WO-2020137206 | A1 * | 7/2020 | ....... | A61F 13/15764 |
| WO | 2020/250710 | A1 | 12/2020 | | |

OTHER PUBLICATIONS

International Search Report for corresponding Application No. PCT/JP2022/027720, mailed Sep. 20, 2022.

* cited by examiner

FIG. 4

FIG. 8  PRIORPART
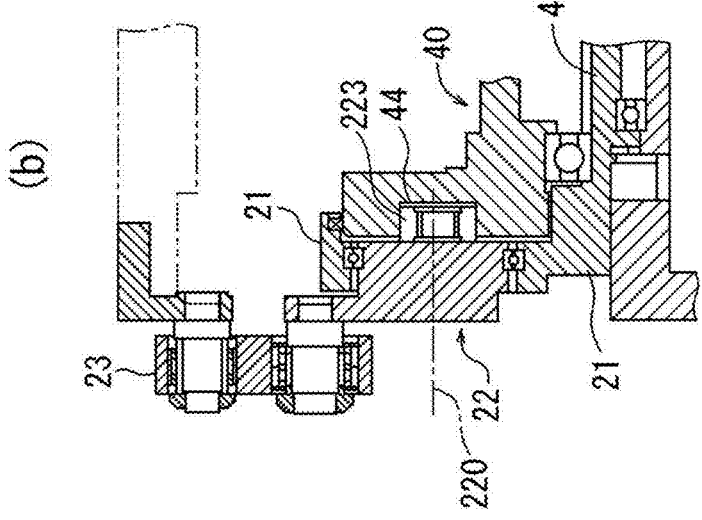
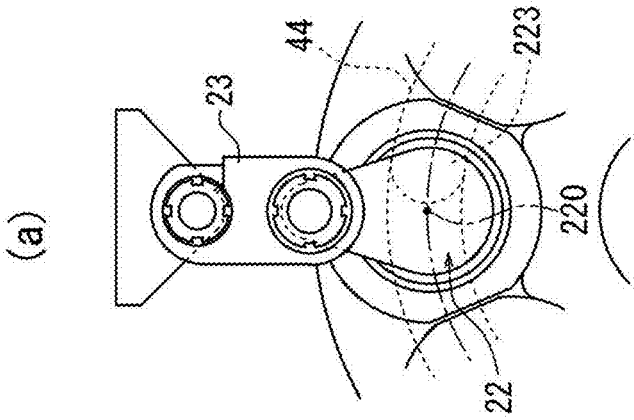

TRANSPORT DEVICE

TECHNICAL FIELD

The present invention relates to a transport device of a wearing article that holds a workpiece constituting a part of the wearing article by each of a plurality of pads and transports the workpiece while the pads circulate.

BACKGROUND ART

There is a known transport device that receives a workpiece at a reception position, changes a peripheral speed (angular velocity) of a pad until delivering the workpiece at a delivery position, and changes an interval between pads adjacent to each other (Patent Literatures 1 to 3).

CITATION LIST

Patent Literatures

Patent Literature 1: Japanese Unexamined Patent Application Publication (Translation of PCT Application) No. 2015-530931 (FIG. 1)
Patent Literature 2: Japanese Patent No. 4054191
Patent Literature 3: Japanese Patent No. 5347148

SUMMARY OF INVENTION

Patent Literature 1 discloses arranging a motor for each pad and changing a speed by the motor. However, Patent Literature 1 does not disclose a specific structure of a transmission mechanism.

In the invention of Patent Literature 2, a speed of a pad is changed by a cam. However, since a shape and a structure of the cam is fixed, there is no freedom of change of an interval between pads, so that a size change and a type change of a workpiece are hard to be handled.

FIGS. 8(*a*) and (*b*) are a front view and a cross-sectional view illustrating a transmission mechanism and the like disclosed in Patent Literature 2 described above. In these drawings, in a crank arm 22 connected to a pad (not illustrated) via a link lever 23, a cam roller 223 is fitted into a cam groove 44 of a base part 40 at a swing center 220 of the crank arm 22. The base part 40 supports a rotation shaft 41 and is fixed to a frame of a system. In this prior art, the crank arm 22 swings by rotation and movement of the cam roller 223 along the cam groove 44 while the cam roller 223 is swingably fitted into a rotation body 21 that rotates together with the rotation shaft 41 at the swing center 220 of the crank arm 22.

In such a structure, the motor cannot drive the crank arm 22 to swing.

There is no disclosure or suggestion of attaching the motor to the rotation body 21 described above. Even if the motor is attached to the rotation body 21, the motor cannot be attached in a manner to swing the crank arm 22.

In the invention of Patent Literature 3, a speed is changed by a pulley provided for each pad. The pulley that receives an output of the motor projects in both radial direction and axial direction of the transport device and causes an increase in size of the transport device.

Accordingly, an object of the present invention is to provide a transport device in which an increase in size of a transport device is suppressed as much as possible and a degree of freedom of a change of an interval between pads and also a degree of freedom of a change of an interval between workpieces are large.

A transport device of the present invention is a transport device including a plurality of pads 20 that hold a workpiece W constituting a part of a wearing article and transport the workpiece W while a peripheral speed is changed, the transport device further including:

a rotation shaft 41 having an axial line S serving as a rotation center;

the plurality of pads 20 that hold and transport the workpiece W while the peripheral speed is changed with respect to the rotation shaft 41;

transmission (speed-change) mechanisms 2 that respectively change speeds of the pads 20; and motors M provided for each of the pads 20 and respectively including output shafts M1 for driving each of the transmission mechanisms 2, the transport device being provided with a rotation body 21 that rotates around the axial line S and is arranged in between the transmission mechanisms 2 and the motors M in a direction in which the axial line S extends, in which each of the motors M is attached (connected) to the rotation body 21, and is arranged around the axial line S of the rotation shaft 41 such that the output shafts M1 are each parallel to the direction in which the axial line S of the rotation shaft 41 extends.

According to the present invention, the speed of the pad is changed via the transmission mechanism by changing the speed of the motor provided for each pad. Therefore, a degree of freedom of a change of an interval between pads and also a degree of freedom of a change of an interval between workpieces are large.

Since each motor is arranged around the rotation shaft such that the output shafts of each motor are parallel to the axial line of the rotation shaft, even when a large number of motors that are long in the axial direction are arranged, the transport device is hard to be increased in size.

BRIEF DESCRIPTION OF DRAWINGS

FIG. 4 is a partially enlarged view of the transport device in a motor M next to the one motor M.

FIGS. 8(*a*) and (*b*) are a front view and a cross-sectional view illustrating a transmission mechanism disclosed in U.S. Pat. No. 4,054,191.

In FIGS. 2, 3, 4, 6, and 7, some components are illustrated by gray color instead of hatching indicating a cross section to make the drawings easy to view.

DESCRIPTION OF EMBODIMENTS

Figure 1:
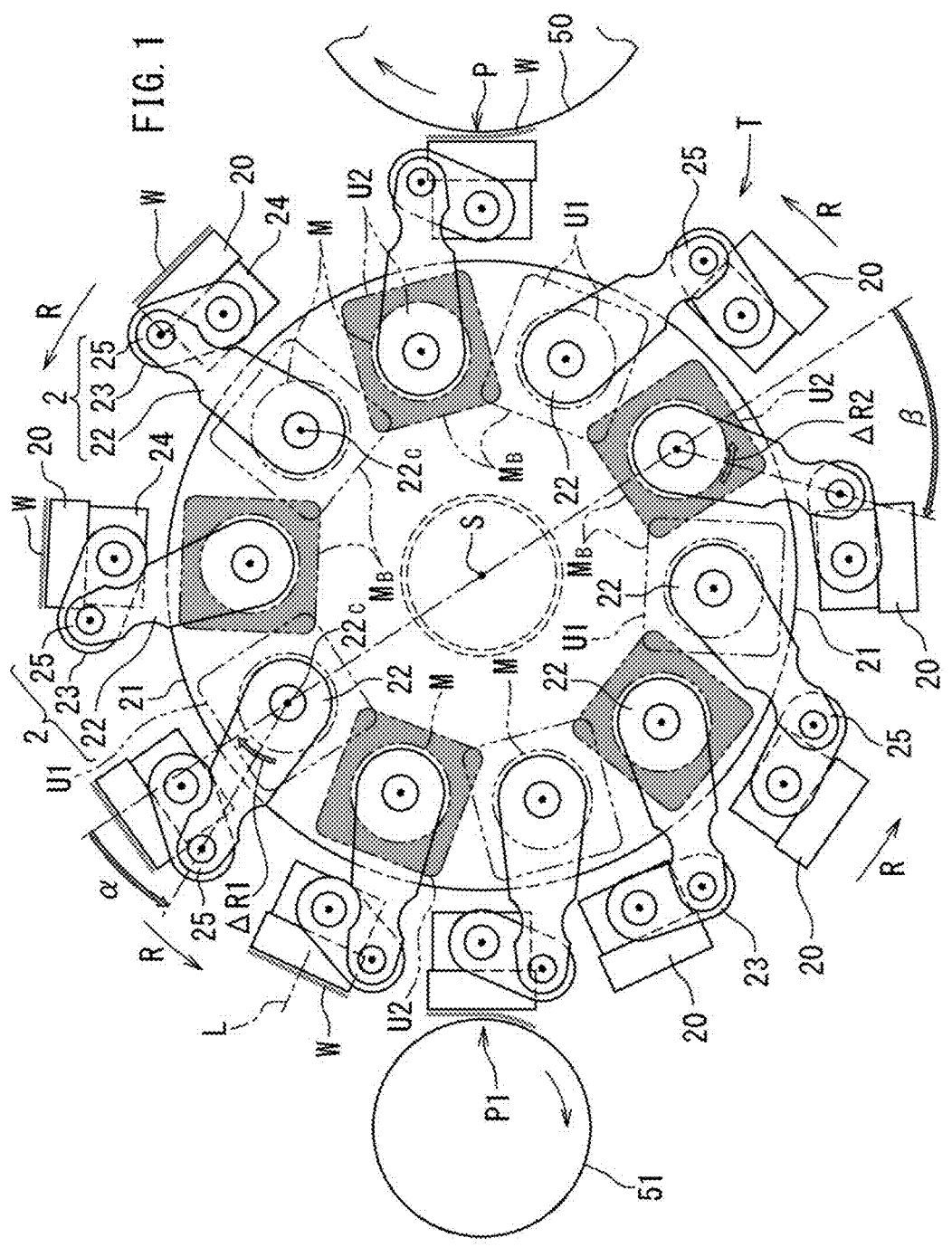
FIG. 1 is a front view illustrating a first embodiment of a transport device of the present invention.

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

Embodiments of the present invention will be described below according to the drawings. FIGS. 1 to 4 illustrate a first embodiment.

FIG. 1 is a schematic front view of a transport device T and other parts according to the first embodiment of the present invention.

Each of a plurality of pads 20 rotates along a circulation track of the transport device T while the speed is changed, receives a workpiece W from a delivery roll 50 at a reception position P and delivers the workpiece W onto a transfer roll 51 at a delivery position P1.

The transport device T includes a transmission mechanism 2 described below, for each pad 20. The transmission mechanism 2 is driven by a motor M provided for each pad 20.

Figure 2:
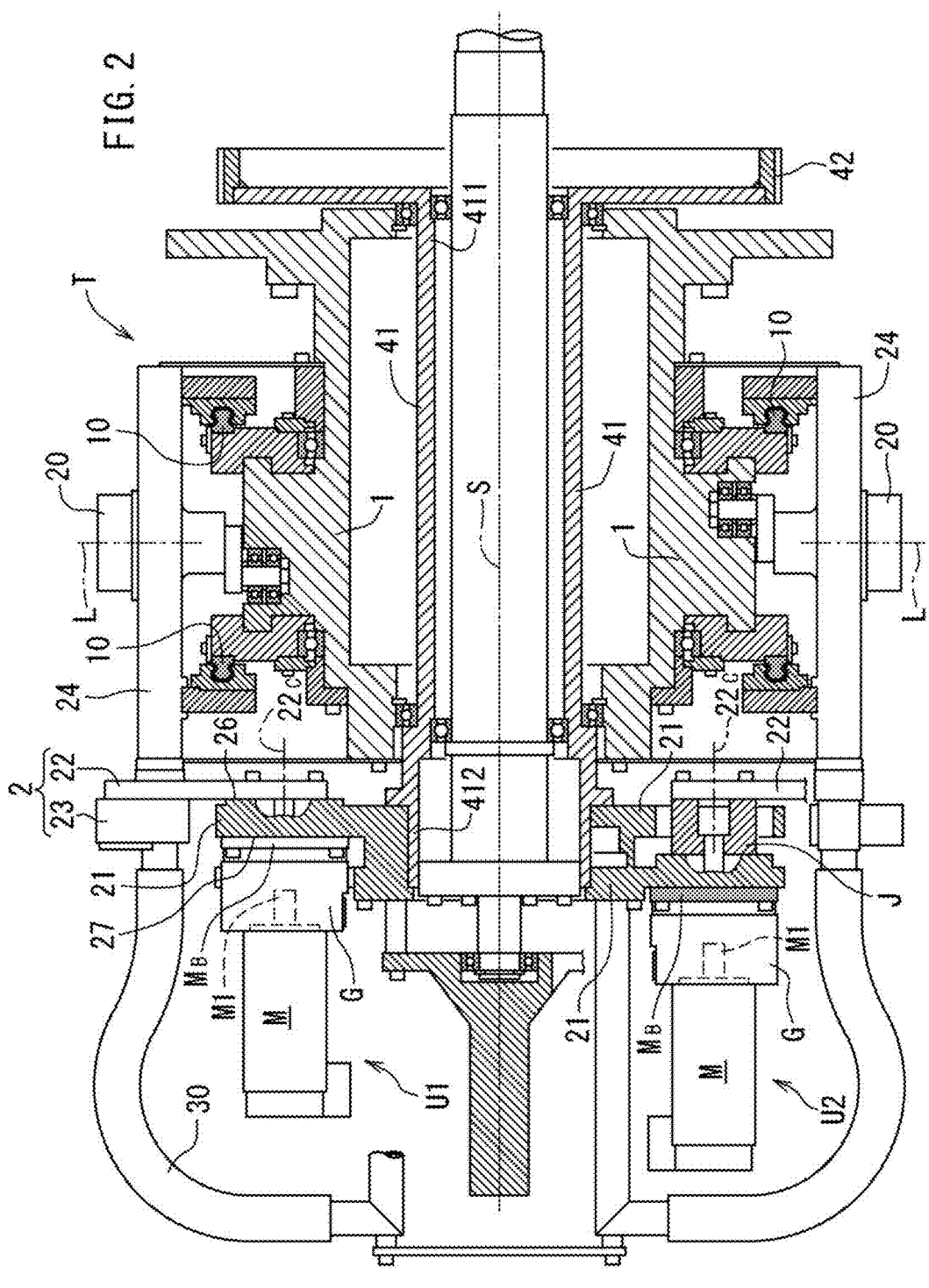
FIG. 2 is a vertical cross-sectional view of the same.

As illustrated in FIG. 2, the transport device T includes a hollow rotation shaft 41 having an axial line S serving as a rotation center, and a rotation body 21 that rotates around the rotation shaft 41 integrally with the rotation shaft 41. Each of the pads 20 holds and transports the workpiece W while a peripheral speed (angular velocity) thereof is changed with respect to the rotation shaft 41.

Next, details of the transmission mechanism 2 of this embodiment will be described.

Each transmission mechanism 2 includes a crank arm 22 that swings by an input from an output shaft M1 of the motor M of FIG. 2, and a link lever 23 that connects a distal end 25 of the crank arm 22 and the pad 20 of FIG. 1.

As illustrated in FIG. 1, the rotation body 21 is attached with a plurality of crank arms 22 that swing around a swing center 22c. The swing centers 22c of a plurality of the crank arms 22 are arranged at an equal angular pitch in a virtual circumference. The interval of the swing centers 22c of each crank arm 22 is invariable. The swing centers 22c of the crank arms 22 rotate at the same angular velocity together with the rotation body 21 of FIG. 2.

In FIG. 2, the output shaft M1 of the motor M is connected to the swing center 22c of the crank arm 22 via a decelerator G, and reciprocating rotates to cause the crank arm 22 to swing around the swing center 22c.

The crank arm 22 of FIG. 1 periodically swings within a certain angular range, and the distal end 25 of the crank arm 22 periodically swings. That is, in FIG. 1, during deceleration, the distal end 25 of the crank arm 22 is displaced by an angle α in a transport direction along the circulation direction R from the swing center 22c of the crank arm 22, and, during acceleration, the distal end 25 is displaced by an angle β in a direction opposite to the transport direction.

A link lever 23 pin-connected to the distal end 25 of the crank arm 22 and a connection block 24 pin-connected to the link lever 23 are also displaced in conjunction with swing of the distal end 25 of the crank arm 22. The swing of the crank arm 22 causes the connection block 24 to be displaced in a peripheral direction with respect to the swing center 22c of the crank arm 22, and therefore, the intervals between connection blocks 24 located forward and rearward also change. As a result, an angular velocity of the holding pad 20 arranged in the connection block 24 changes and an interval in the circulation direction R between pads 20, 20 that are adjacent to each other changes.

A range (α+β) of swing of the crank arm 22 is determined by a range of a rotation angle of the motor M. Accordingly, by controlling the range of the rotation angle of the motor M, the range (α+β) of the swing and also the interval between pads 20, 20 that are adjacent to each other can be freely set.

Next, further details of the transport device T will be described.

In FIG. 2, the rotation shaft 41 is rotatably supported by a fixation drum 1. The fixation drum 1 is provided with a pair of guide members 10. The guide members 10 rotatably support the pad 20 with respect to the fixation drum 1 and guide the circulation of the pad 20.

The fixation drum 1 is fixed to a frame of an instrument (not illustrated).

The rotation shaft 41 is provided so as to penetrate the fixation drum 1. An input unit 42 that inputs a drive force to the rotation shaft 41 is attached to a first end 411 that is one end projecting from the fixation drum 1 in the rotation shaft 41.

The rotation body 21 is attached to a second end 412 that is the other end projecting from the fixation drum 1 of the rotation shaft 41. The rotation body 21 is fixed to the rotation shaft 41 so as to rotate around the axial line S integrally with the rotation shaft 41. The rotation body 21 is arranged in between the transmission mechanisms 2 and the motors M in a direction in which the axial line S extends.

Each motor M is fixed to the rotation body 21 via each decelerator G. In this manner, each motor M is arranged in the other side opposite to one side in which the input unit 42 is arranged in the fixation drum 1. Each motor M may be fixed to the rotation body 21 via the decelerator G and a joint J.

That is, the rotation body 21 includes an inside surface 26 and an outside surface 27. A plurality of the pads 20 and the fixation drum 1 are arranged in between the input unit 42 and the inside surface 26 of the rotation body 21, the fixation drum 1 being configured to rotatably support the pads 20. On the other hand, each motor M is attached to the outside surface 27 opposite to the inside surface 26 in the rotation body 21. In this manner, the fixation drum 1 and the pad 20 are arranged in the inside surface 26 side of the rotation body 21 and each motor M is arranged in the outside surface 27 side of the rotation body 21.

Figure 3:
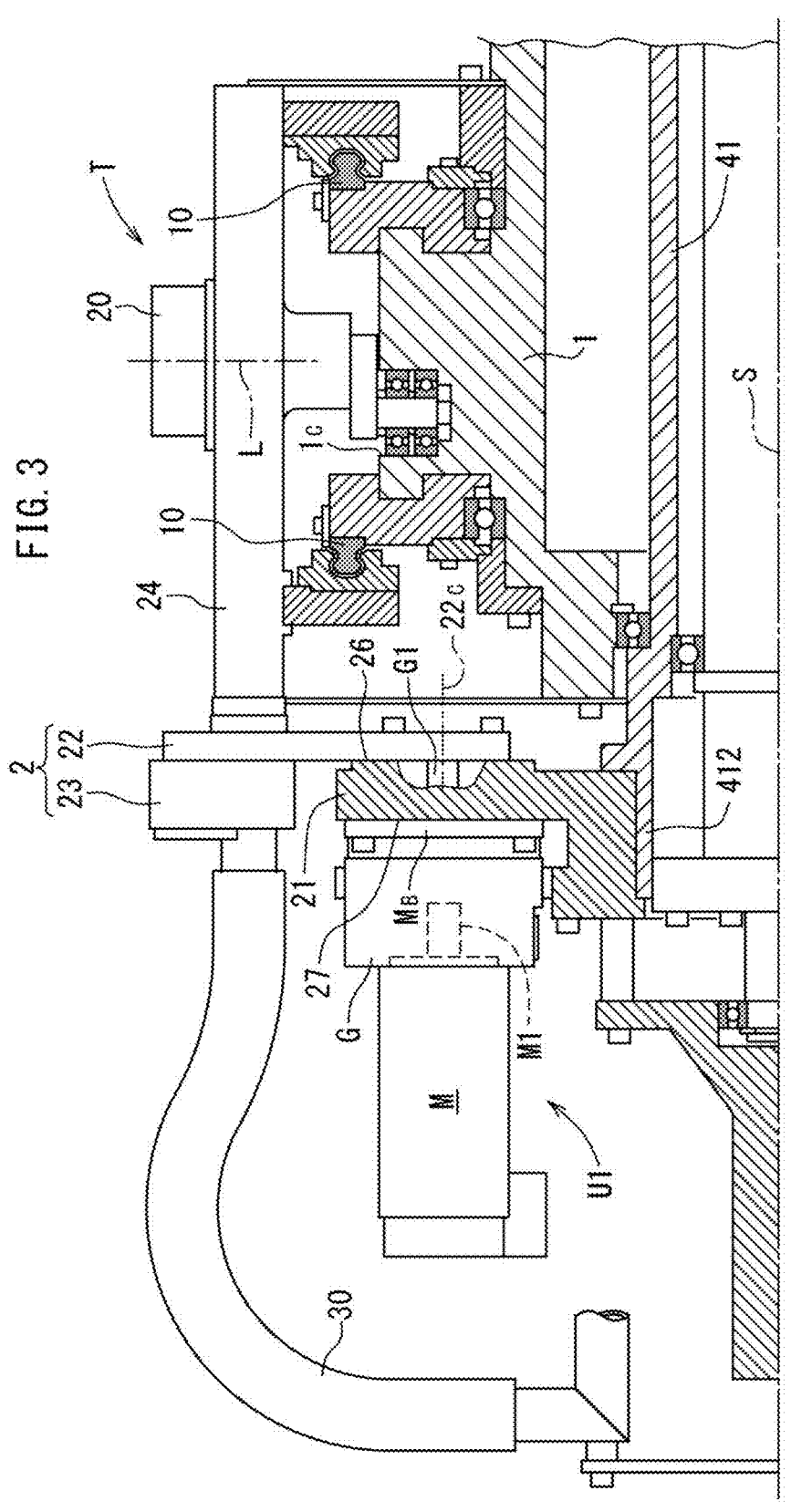
FIG. 3 is a partially enlarged view of the same portion of the transport device in one motor M.

In FIG. 1, each motor M attached to the rotation body 21 is arranged at an equal angular pitch in a virtual circumference around the axial line S of the rotation shaft 41 (FIG. 3). As illustrated in FIG. 2, the rotation body 21 is arranged such that the output shafts M1 of the motors M are parallel to the direction in which the axial line S of the rotation shaft 41 extends. In this manner, each motor M can be efficiently arranged in a dead space generated due to a suction air wiring material 30 of the pad 20. A workpiece is sucked and held to each pad 20 by air sucked through the wiring material 30, that is, a negative pressure of the suction air.

Figure 4:
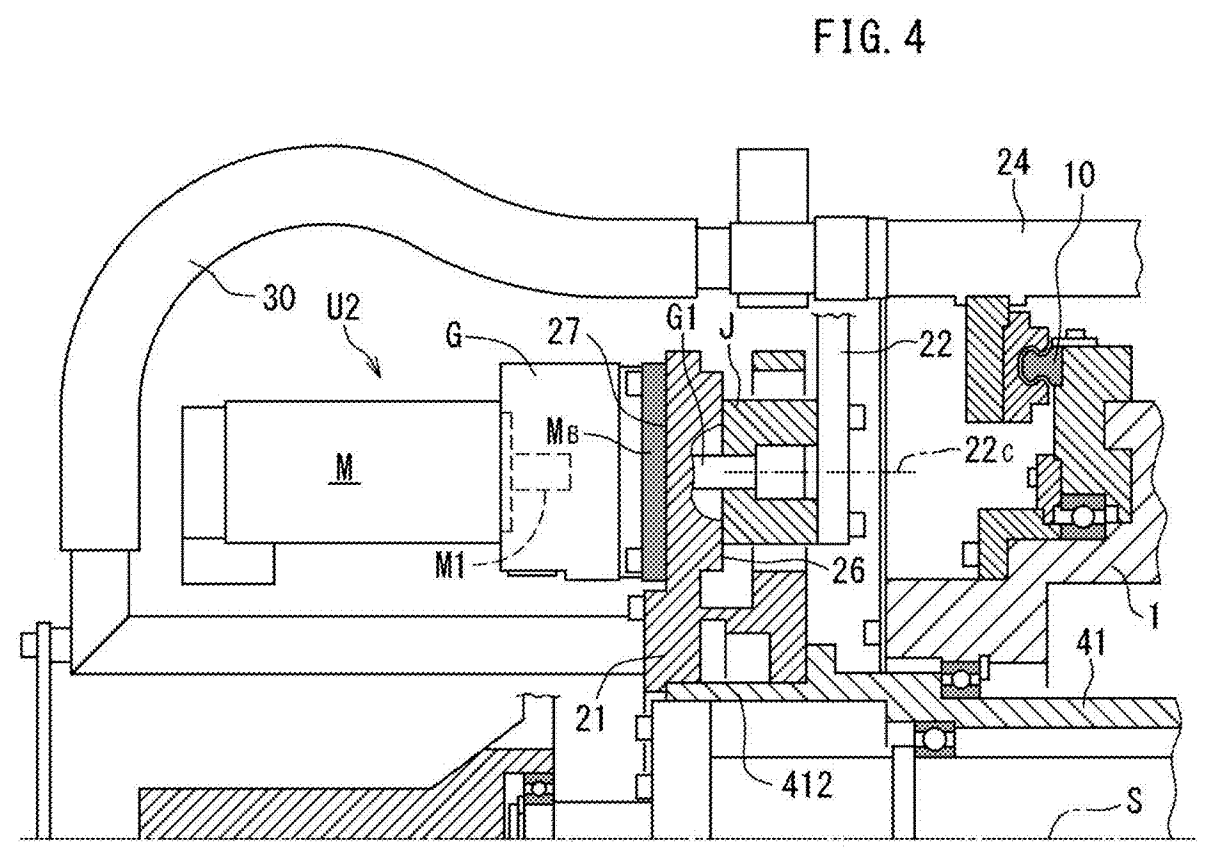

FIGS. 3 and 4 illustrate motors M adjacent to each other in the circulation direction R, the decelerator G, and the like. As illustrated in FIGS. 3 and 4, motors M adjacent to each other among each motor M are arranged by being offset (see FIG. 2) from each other in the axial line S direction of the rotation shaft 41. That is, each motor M includes each decelerator G connected to the output shaft M1, and attachment bases (attachment flanges) $M_B$ of decelerators G adjacent to each other among each decelerator G are arranged by being offset from each other in the axial line S direction of the rotation shaft 41. Each decelerator G is attached to the rotation body 21 via the attachment base $M_B$. More specifically, as illustrated in FIG. 3, in one motor M among each motor M in FIG. 1, the output shaft G1 of the decelerator G is connected directly to the crank arm 22 of the transmission mechanism 2.

On the other hand, as illustrated in FIG. 4, in the motor M next to the one motor M described above among each motor M of FIG. 1, the output shaft G1 of the decelerator G is connected to the crank arm 22 of the transmission mechanism 2 via the joint J.

As illustrated in FIG. 2, the decelerator G has a diameter larger than that of the motor M. The attachment bases $M_B$ have a substantially rectangular shape indicated by a virtual line in FIG. 1, and the attachment bases $M_B$ adjacent to each other interfere with each other in a plan view. Therefore, as illustrated in FIGS. 3 and 4, by offsetting the attachment bases $M_B$ adjacent to each other (arranging the attachment bases $M_B$ adjacent to each other such that their positions are shifted from each other) in the axial line S direction, this interference can be prevented, so that the motors M can be arranged densely and a large number of pads 20 can be provided as illustrated in FIG. 1.

As illustrated in FIG. 2, the decelerator G is connected to each motor M and the motor M and the decelerator G connected to each other constitute a unit. All units include a first unit U1 belonging to one group and a second unit U2 belonging to the other group. In FIG. 1, the attachment base $M_B$ of the decelerator G (FIG. 2) of the second unit U2 belonging to the other group is indicated by gray color.

As illustrated in FIG. 1, the first unit U1 and the second unit U2 are adjacent to each other in the peripheral direction. The attachment bases $M_B$ of the units adjacent to each other are arranged so as to overlap each other in the front view of FIG. 1. However, they are offset from each other as described above, the attachment bases $M_B$ adjacent to each other do not interfere with each other.

This feature will be described below more specifically.

FIG. 3 illustrates one representation of a plurality of first units U1.

The first unit U1 illustrated in FIG. 3 includes the motor M, the decelerator G, and the attachment base $M_B$. In a group of this first unit U1, although not illustrated, each motor M is arranged at the same position in the axial line S direction, each decelerator G is arranged at the same position in the axial line S direction, and each attachment base $M_B$ is arranged at the same position in the axial line S direction.

FIG. 4 illustrates one representation of a plurality of second units U2.

The second unit U2 illustrated in FIG. 4 includes the joint J in addition to the motor M, the decelerator G, and the attachment base $M_B$ thereof. In a group of this second unit U2, although not illustrated, each motor M is arranged at the same position in the axial line S direction, each decelerator G is arranged at the same position in the axial line S direction, and each attachment base $M_B$ is arranged at the same position in the axial line S direction. Furthermore, each joint J is arranged at the same position in the axial line S direction.

That is, the motor M of the first unit U1 and the motor M of the second unit U2 of FIG. 2 are offset from each other in the axial line S direction by an amount corresponding to the length of the joint J. As similar to this, the decelerator G of the first unit U1 and the decelerator G of the second unit U2 are also offset from each other and the attachment base $M_B$ of the first unit U1 and the attachment base $M_B$ of the second unit U2 are also offset from each other.

Accordingly, the attachment bases $M_B$ adjacent to each other that are viewed as if they overlap each other in FIG. 1 do not interfere with each other.

When the number of groups of the units U1 and U2 are two, the total number of the units U1 and U2 and the number of the motors M are a multiple of two. For example, in the case of this example, the number of each of these is 10.

The number of groups may be three or more. In that case, the number of units may not be a multiple of two and may not be a multiple of three. However, in consideration of the degree of accommodation of the device in the axial line S direction and the number of components, it is preferable that the number of groups is two.

In this example, the offset described above is achieved by providing the joint J in FIG. 2. However, a spacer or the like may be provided as long as it can offset the positions in the axial line S direction, or otherwise, the shape of the crank arm may be changed.

As described above, the motor M is attached in the outside surface 27 opposite to the side in which the pad 20 in the rotation body 21 of FIG. 2 is arranged. On the other hand, the crank arm 22 is arranged along the inside surface 26 opposite to the outside surface 27 of the rotation body 21.

The output shaft M1 of the motor M is connected to the swing center 22c of the crank arm 22 via the decelerator G, and causes the crank arm 22 to swing around the swing center 22c.

In FIG. 1, in the case of this example, the pad 20 causes the connection block 24 to turn around a normal line L of the circulation direction R by 90° and causes the workpiece W to turn by 90°. That is, when the pad 20 in FIG. 1 receives the workpiece W from the delivery roll 50 at the reception position P, the pad 20 turns while changing a speed, circulates to the delivery position P1, and delivers the workpiece W onto the transfer roll 51 at the delivery position.

After this deliver operation, the pad 20 turns while changing the speed during circulation from the delivery position P1 in the circulation direction R, circulates to the reception position P, and receives the workpiece W at the reception position P. These operations are consecutively performed by each pad 20, so that the workpieces W are successively transported.

The mechanism in which the pad 20 in FIGS. 3 and 4 turns around the normal line L by 90° may include a known peripheral surface cam 1c or the like. Such a mechanism is disclosed in WO2005/075163, for example, and the entire description of which are incorporated herein.

The pad 20 in FIG. 1 sucks the workpiece W at the reception position P by a negative pressure, then holds the workpiece W, circulates along the circulation direction R, and releases the negative pressure in the upstream position further than the delivery position P1.

Next, the details of the operation of the transport device T at the time of transport will be described.

In FIG. 2, when the rotation shaft 41 rotates at a substantially constant angular velocity by the rotation force from the input unit 42, the tabular rotation body 21, the motor M, and the swing center 22c of the crank arm 22 of FIG. 1 also rotate at a constant angular velocity.

In a first path (upper part in the drawing) from the reception position P to the delivery position P1 in FIG. 1, each pad 20 holds the workpiece W, and, in this example, the pads 20 adjacent to each other approach each other while each pad 20 is decelerated. On the other hand, in a second path (lower part in the drawing) from the delivery position P1 to the reception position P in FIG. 1, each pad 20 does not hold the workpiece W, and, in this example, the pads 20 adjacent to each other go away from each other while the speed of each pad 20 is accelerated.

At the time of deceleration of the pad 20 of FIG. 1, that is, in the first path of the upper part close to the delivery position P1, the motor M rotates in a first direction such that the rotation force in a reverse direction ΔR1 is loaded to the crank arm 22 with respect to the circulation direction R of the pad 20. That is, the motor M rotates in the first direction so as to impart a negative angular acceleration to the swing center 22c of the crank arm 22 such that a lead angle α of the crank arm 22 becomes small.

On the other hand, at the time of acceleration of the pad 20 of FIG. 1, that is, in the second path of the lower part close to the reception position P, the motor M rotates in a second direction such that the rotation force in the same direction ΔR2 as the circulation direction R of the pad 20 is loaded to the crank arm 22. That is, the motor M rotates in the second direction so as to impart a positive angular acceleration to the swing center 22c of the crank arm 22 such that a delay angle β of the crank arm 22 becomes small.

In this manner, the crank arm 22 swings around the swing center 22c during the circulation while the swing center 22c of the crank arm 22 rotates in the circulation direction R of the pad 20 at a constant angular velocity. As a result, the distal end 25 of the crank arm 22 accelerates or decelerates, and the pad 20 connected to the distal end 25 via the link lever 23 and the connection block 24 circulates while the pad 20 is also accelerated and decelerated.

Although the pad 20 circulates along a circular track while being guided by the guide member 10 (FIG. 3), since the distal end 25 of FIG. 1 is not along the circular track, the link lever 23 is interposed.

Figure 5:
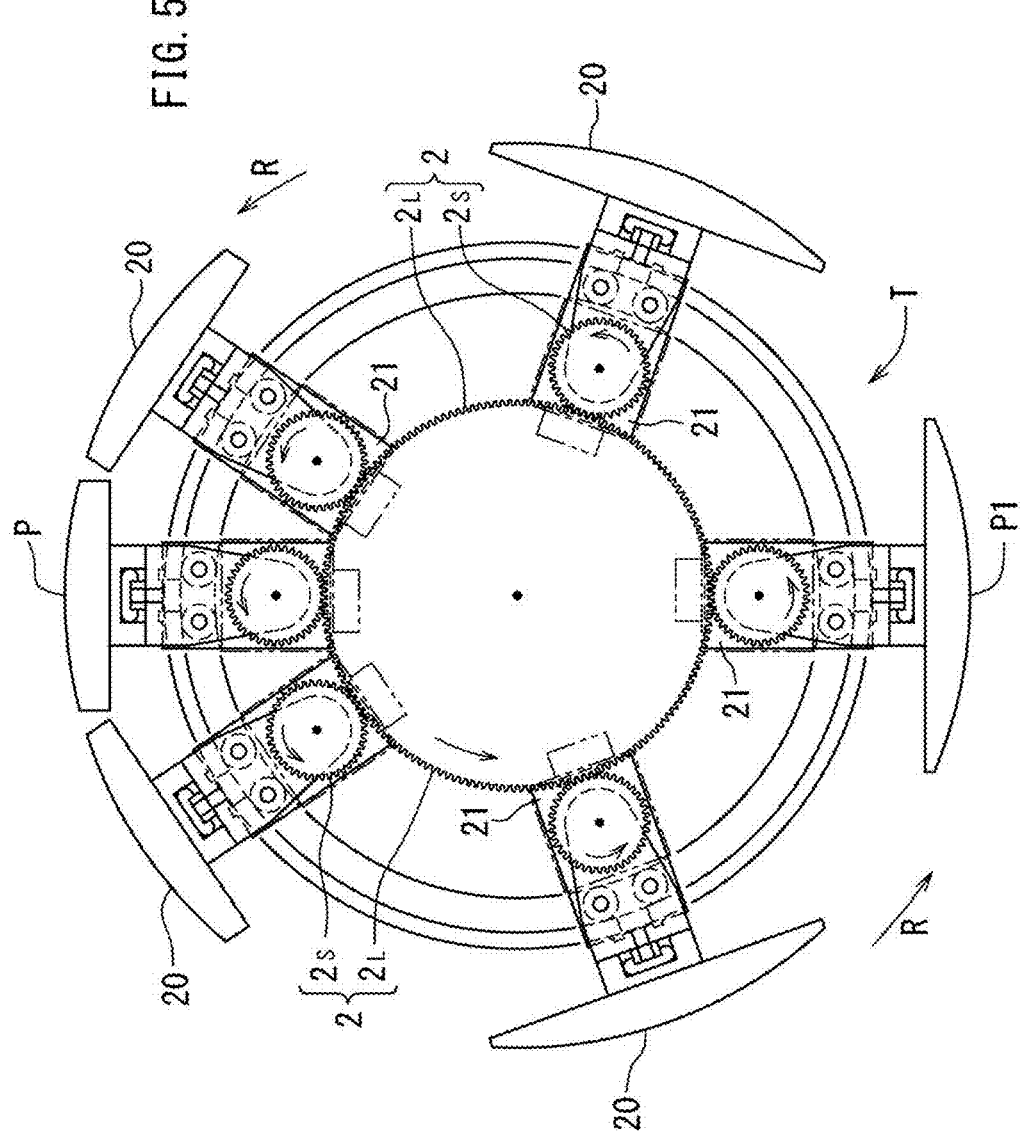
FIG. 5 is a front view illustrating a second embodiment of the transport device of the present invention.
Figure 6:
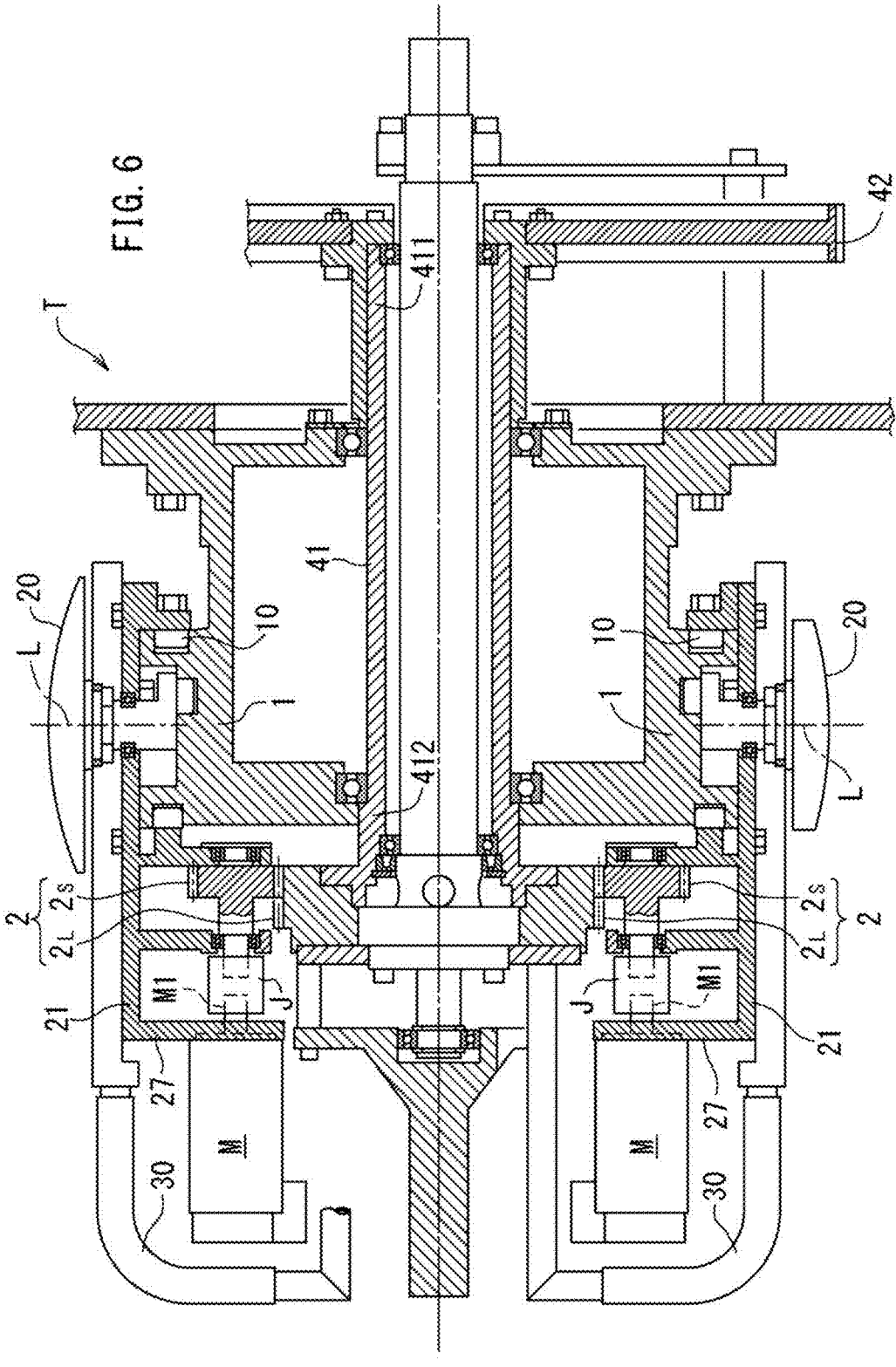
FIG. 6 is a vertical cross-sectional view of the same.
Figure 7:
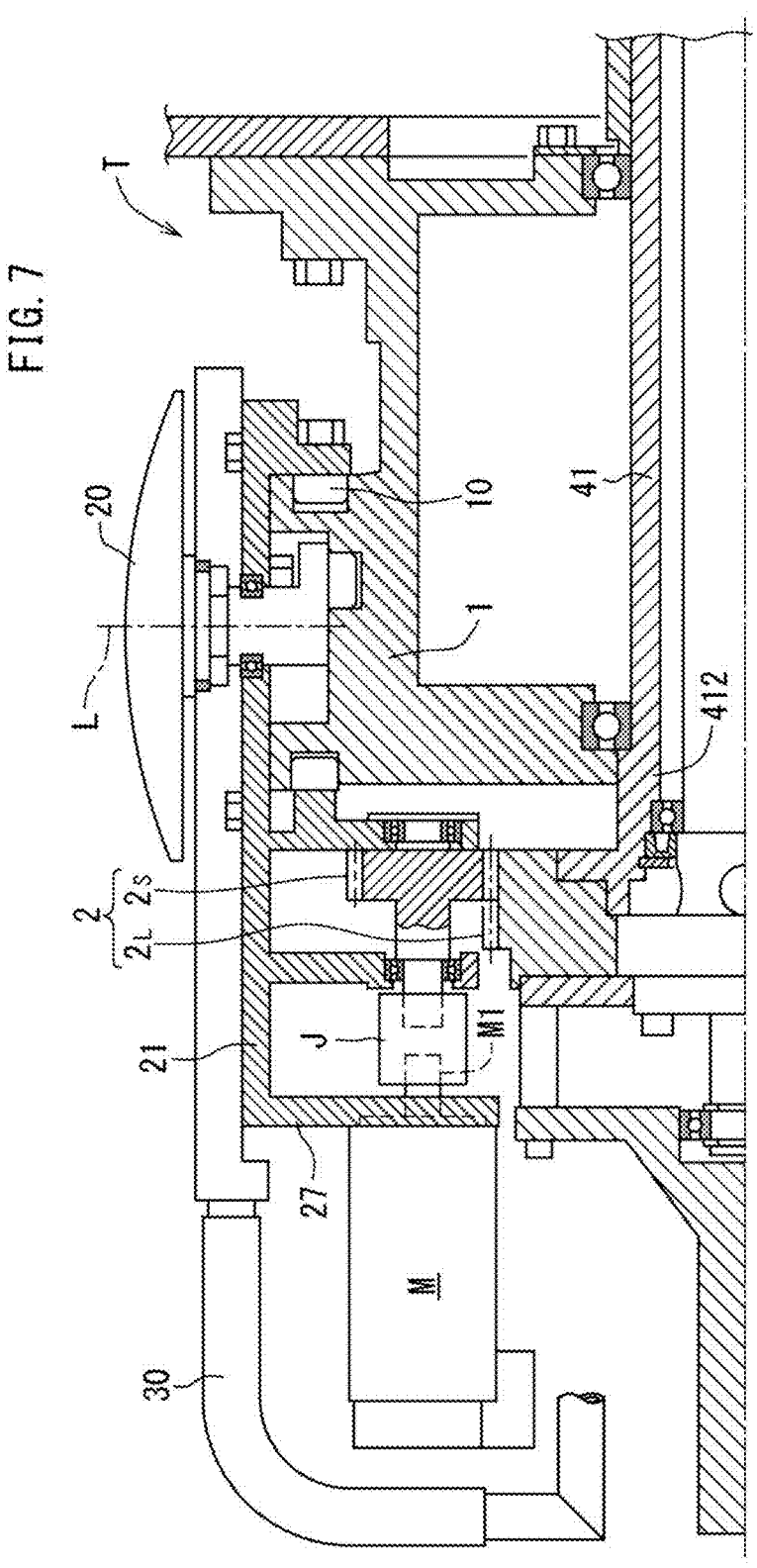
FIG. 7 is an enlarged view of the same portion.

FIGS. 5 to 7 illustrate a second embodiment. The configurations of the second embodiment different from those of the first embodiment will be mainly described below.

In the above-described first embodiment, the rotation body 21 in FIG. 1 is continuous in the circulation direction R. However, in the second embodiment, the rotation bodies 21 of FIG. 5 are separated in units of each pad 20 in the circulation direction R. In the above-described first embodiment, the transmission mechanism 2 of FIG. 1 includes the crank arm 22 and the link lever 23 for each pad 20. However, in the second embodiment, one sun gear $2_L$ of FIG. 6 and a planetary gear $2_S$ provided for each pad 20 are provided. Details of these will be described below.

In FIG. 6, the sun gear $2_L$ rotates at a substantially constant speed integrally with the rotation shaft 41. On the other hand, the rotation body 21 circulates together with the pad 20 while the speed is accelerated or decelerated in the circulation direction R of FIG. 5.

As illustrated in the enlarged view of FIG. 7, the circulation track of each rotation body 21 is defined with respect to the fixation drum 1 via the guide member 10. The pad 20 is supported to each rotation body 21 such that the pad 20 can turn around the normal line L.

In FIG. 7, each rotation body 21 is fixed with the motor M for speed change. The output shaft M1 of the motor M is connected to the planetary gear $2_S$ via the joint J. The planetary gear $2_S$ is meshed with the sun gear $2_L$.

An overview of the operation of the transport device T of the second embodiment will be described.

In FIG. 5, when the sun gear $2_L$ rotates in the circulation direction R now, the planetary gear $2_S$ meshed with the sun gear $2_L$ and the rotation body 21 also circulate in the circulation direction R. On the other hand, when the output shaft M1 (FIG. 6) of the motor M rotates in the same direction as the circulation direction R of the rotation body 21, the angular velocity of circulation of the planetary gear $2_S$ and the rotation body 21 is increased.

Accordingly, when the rotation speed of the output shaft M1 (FIG. 6) of the motor M increases or decreases, the rotation speed of the rotation body 21 and the rotation speed of the pad 20 also increase or decrease.

For example, when the pad 20 circulates from the reception position P to the delivery position P1 of FIG. 5, if the rotation speed of the motor M is increased, the circulation speed in the circulation direction R of the rotation body 21 and the pad 20 is accelerated, so that the interval between the pads 20, 20 adjacent to each other becomes large.

On the other hand, when the pad 20 circulates from the delivery position P1 to the reception position P of FIG. 5, if the rotation speed of the motor M becomes small, the circulation speed in the circulation direction R of the rotation body 21 and the pad 20 is decelerated, so that the interval between the pads 20, 20 adjacent to each other becomes small.

In this manner, re-pitch operation of the pad 20 is achieved by the acceleration or deceleration of the output shaft M1 (FIG. 6) of the motor M.

The first and second embodiments described above include specific inventions below.

Preferably, the transmission mechanisms 2 each include the crank arm 22 that swings by an input from the output shaft M1 of each motor M, and the link lever 23 that connects the distal end 25 of the crank arm 22 and the pad 20.

In this case, components and structures that are conventionally manufactured can be adopted, so that detailed designs are made easy.

More preferably, the rotation body 21 is fixed to the rotation shaft 41 so as to rotate around the axial line S integrally with the rotation shaft 41, the output shafts M1 of the motors M are connected to the swing center 22c of the crank arm 22 and configured to cause the crank arm 22 to swing around the swing center 22c.

In this case, the structure in which the motor M causes the crank arm 22 to swing can be easily achieved.

More preferably, the motors M are attached to the outside surface 27 opposite to the side in which the pads 20 are arranged in the rotation body 21, and the crank arm 22 is arranged along the inside surface 26 opposite to the outside surface 27 of the rotation body 21.

In this case, since the motor M and the crank arm 22 are attached to two side surfaces 26, 27 of the rotation body 21, the motor M and the crank arm 22 are made easy to be attached to the rotation body 21.

Preferably, the motors M adjacent to each other among each motor M are arranged by being offset from each other in the axial line S direction of the rotation shaft 41.

In this case, the motors M adjacent to each other can be prevented from interfering with each other, so that a large number of pads can be arranged densely.

Preferably, the motors M respectively include each decelerator G connected to the output shaft M1, and the attachment bases $M_B$ of the decelerators G adjacent to each other among each decelerator G are arranged by being offset from each other in the axial line S direction of the rotation shaft 41.

In this case, the attachment bases of the decelerators that are larger than the motor can be prevented from interfering with each other, so that a large number of pads can be arranged densely.

Preferably, the output shaft G1 of the decelerator G of one motor M among each motors M are connected directly to the transmission mechanism 2, and the output shaft G1 of the decelerator G of the motor M next to the one motor M among each motors M is connected to the transmission mechanism 2 via the joint J.

In this case, the offset of the decelerator G is enabled by the joint J and the offset described above is enabled in the motor and the decelerator having the same shape and structure.

Preferably, a plurality of the rotation bodies 21 are provided so as to be separated from each other for each pad 20, and each transmission mechanism 2 includes the sun gear 2; that rotates integrally with the rotation shaft 41, and a planetary gear 2$_S$ that is connected to the output shaft M1 of the motor M fixed to the rotation body 21 and rotates.

In this case, a novel structure of re-pitch can be provided, and also, the motor M does not need to be rotated in forward and reverse directions, so that the speed change of the pad 20 becomes smooth.

Preferably, the input unit 42 that inputs the drive force to the rotation shaft 41 is further provided, the plurality of pads 20 are arranged between the input unit 42 and the inside surface 26 of the rotation body 21, the motor M is attached to the outside surface 27 opposite to the inside surface 26 in the rotation body 21, the pad 20 is arranged in the inside surface 26 side of the rotation body 21, and the motor M is arranged in the outside surface 27 side of the rotation body 21.

Preferably, the fixation drum 1 that rotatably supports the rotation shaft 41, and the guide member 10 that rotatably supports the pad 20 with respect to the fixation drum 1 and guides the circulation of the pad 20 are further provided, the rotation shaft 41 is provided so as to penetrate the fixation drum 1, the input unit 42 that inputs the drive force to the rotation shaft 41 is attached to the first end 411 that is one end of the rotation shaft 41 in the axial direction, the rotation body 21 is attached to the second end 412 that is the other end of the rotation shaft 41, and as a result, each motor M is arranged in the other side opposite to the one side in which the input unit 42 is arranged in the fixation drum 1.

In these cases, the motor M can be arranged in the side opposite to the input unit 42, which makes the arrangement of the motor M easy.

The preferable embodiments are described above with reference to the drawings. However, a skilled person in the art would easily conceive of various variations and modifications within an obvious scope with reference to this specification.

For example, during movement of the workpiece from the reception position to the delivery position, the workpiece may not be rotated around the normal line by 90°. Furthermore, the pad may be decelerated or accelerated between the reception position and the delivery position.

Furthermore, the workpiece may be a consecutive sheet that is folded during transporting.

Accordingly, variations and modifications as described above are construed as being within the scope of the present invention defined by the claims.

INDUSTRIAL APPLICABILITY

The present invention can be used in transporting in manufacturing of various articles such as a disposable diaper or a diaper.

REFERENCE SIGNS LIST

1: Fixation drum
1c: Peripheral surface cam
10: Guide member
2: Transmission mechanism
21: Sun gear
2s: Planetary gear
20: Pad
21: Rotation body
22: Crank arm
22c: Swing center
23: Link lever
24: Connection part
25: Distal end
26: Inside surface
27: Outside surface
30: Wiring material
41: Rotation shaft
42: Input unit
411: First end
412: Second end
50: Delivery roll
51: Transfer roll
M: Motor
M1: Output shaft
M$_B$: Attachment base G: Decelerator G1: Output shaft
J: Joint
P: Reception position
P1: Delivery position
R: Circulation direction
S: Axial line
L: Normal line
W: Workpiece
T: Transport device
α: Lead angle
β: Delay angle
ΔR1: Opposite direction
ΔR2: Same direction
U1: First unit
U2: Second unit

The invention claimed is:

1. A transport device having a plurality of pads that each hold a workpiece constituting a part of a wearing article and transport the workpiece while a peripheral speed is changed, the transport device comprising:

a rotation shaft having an axial line serving as a rotation center;

the plurality of pads that each hold and transport the workpiece while the peripheral speed is changed with respect to the rotation shaft;

transmission mechanisms that respectively change speeds of the pads; and motors each provided for the respective pads and each including an output shaft for driving the respective transmission mechanisms, the transport device being provided with a rotation body that rotates around the axial line and is arranged in between each of the transmission mechanisms and each of the motors in a direction in which the axial line extends, wherein:

each of the motors is attached to the rotation body, and each of the motors is arranged around the axial line of the rotation shaft such that the output shaft is parallel to the direction in which the axial line of the rotation shaft extends, the transmission mechanisms each including a crank arm that swings by an input from the output shaft of the respective motors, and a link lever that connects a distal end of the crank arm and the respective pads, the rotation body being fixed to the rotation shaft so as to rotate around the axial line integrally with the rotation shaft, the output shaft of the respective motors being connected to a swing center of the crank arm and configured to cause the crank arm to swing around the swing center, the motors being each attached to an outside surface opposite to a side in which the pads are arranged in the rotation body, the rotation body being arranged between the motors and the transmission mechanisms, and the crank arm being arranged along an inside surface opposite to the outside surface of the rotation body.

2. The transport device according to claim 1, wherein the motors adjacent to each other among the motors are arranged by being offset from each other in the axial line direction of the rotation shaft.

3. The transport device according to claim 2, wherein the motors respectively include decelerators each connected to the output shaft, and attachment bases of the decelerators adjacent to each other among the decelerators are arranged by being offset from each other in the axial line direction of the rotation shaft.

4. The transport device according to claim 3, an output shaft of one of the decelerators of one of the motors is connected directly to the respective transmission mechanisms, and an output shaft of another one of the decelerators of another one of the motors next to the one motor is connected to the respective transmission mechanisms via a joint.

5. The transport device according to claim 1, wherein the rotation body is provided in plural so as to be separated from each other for each of the pads, and each of the transmission mechanisms includes a sun gear $L$ that rotates integrally with the rotation shaft, and a planetary gear that is connected to the output shaft of each of the motors fixed to the rotation body and rotates.

6. The transport device according to claim 1, further comprising an input unit that inputs a drive force to the rotation shaft, wherein the plurality of pads are arranged between the input unit and an inside surface of the rotation body, the motors are attached to an outside surface opposite to the inside surface in the rotation body, the pads are arranged in the inside surface side of the rotation body, and the motors are arranged in the outside surface side of the rotation body.

7. The transport device according to claim 1, further comprising a fixation drum that rotatably supports the rotation shaft, and a guide member that rotatably supports the pads with respect to the fixation drum and guides circulation of the pads, wherein the rotation shaft is provided so as to penetrate the fixation drum, an input unit that inputs a drive force to the rotation shaft is attached to a first end that is one end of the rotation shaft in the axial direction, the rotation body is attached to a second end that is another end of the rotation shaft, and as a result, the input unit is arranged in one side of the fixation drum and each of the motors is arranged in another side opposite to the one side.

\* \* \* \* \*